(12) United States Patent
Cayton et al.

(10) Patent No.: US 11,301,140 B2
(45) Date of Patent: Apr. 12, 2022

(54) CONFIGURING PARAMETERS OF NON-VOLATILE MEMORY TARGET SUBSYSTEMS FOR WORKLOAD REQUEST QUALITY OF SERVICE

(71) Applicant: Intel Corporation, Santa Clara, CA (US)

(72) Inventors: Phil C. Cayton, Warren, OR (US); Rajalaxmi Angadi, Portland, OR (US); David B. Minturn, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/903,582

(22) Filed: Jun. 17, 2020

(65) Prior Publication Data

US 2020/0310657 A1 Oct. 1, 2020

(51) Int. Cl.
*G06F 13/14* (2006.01)
*G06F 3/06* (2006.01)

(52) U.S. Cl.
CPC ............ *G06F 3/0613* (2013.01); *G06F 3/067* (2013.01); *G06F 3/0619* (2013.01); *G06F 3/0629* (2013.01); *G06F 3/0659* (2013.01); *G06F 3/0683* (2013.01)

(58) Field of Classification Search
USPC ....... 710/39, 52–57, 74, 310, 5–10; 711/154; 718/104
See application file for complete search history.

(56) References Cited

U.S. PATENT DOCUMENTS

| | | | |
|---|---|---|---|
| 8,578,106 B1 * | 11/2013 | Shapiro | G06F 3/061 711/154 |
| 10,387,078 B1 * | 8/2019 | Benisty | G06F 3/0679 |
| 2016/0092259 A1 * | 3/2016 | Mehta | G06F 12/0815 718/1 |
| 2017/0083252 A1 * | 3/2017 | Singh | G06F 3/0659 |
| 2018/0253331 A1 * | 9/2018 | Sato | G06F 13/16 |
| 2019/0227718 A1 * | 7/2019 | Frolikov | G06F 3/0644 |
| 2020/0019433 A1 * | 1/2020 | Qiu | G06F 9/5016 |

* cited by examiner

*Primary Examiner* — Ilwoo Park
(74) *Attorney, Agent, or Firm* — Haley Guiliano LLP (57) ABSTRACT

A storage server includes an interface to a storage over fabric network, a plurality of input/output (I/O) queues (IOQs), a plurality of non-volatile data storage devices to store data received from a host computer system over the interface to the storage over fabric network, and a processor to set a maximum number of the IOQs to be provisioned for the host computer system and a maximum depth of the IOQs to be provisioned for the host computer system.

14 Claims, 7 Drawing Sheets

CONFIGURING PARAMETERS OF NON-VOLATILE MEMORY TARGET SUBSYSTEMS FOR WORKLOAD REQUEST QUALITY OF SERVICE

TECHNICAL FIELD

The technical field relates generally to data storage in data centers and, in particular, to configuring parameters affecting workload request quality of service (QoS) for non-volatile memory (NVM) storage devices.

BACKGROUND

Applications being executed by host computer systems in "cloud computing" data centers often store data in data storage subsystems (e.g., apart from the host computer systems). The data storage subsystems typically include many data storage devices for large scale storage of application data. In some large-scale data centers, the number of data storage devices being used can be very large, such as in the tens of thousands, hundreds of thousands, or even millions of devices. The data storage devices usually include non-volatile memory (NVM) storage devices. Large numbers of applications (supporting potentially millions of users) access the data storage subsystems to read and write data. Providing a sufficient Quality of Serve (QoS) for accessing the data by applications is an important metric of data center performance. In some data centers, there are no individualized settings for accessing the data storage subsystems by the host computer systems. Instead, a "one size fits all" approach is used, which may result in bottlenecks and inefficiencies in overall system performance.

BRIEF DESCRIPTION OF THE DRAWINGS

The described embodiments are illustrated by way of example and not limitation in the figures of the accompanying drawings. The methods, processes and logic depicted in the figures that follow can comprise hardware (e.g. circuitry, dedicated logic, controllers, etc.), software (such as is run on a general-purpose computer system or a dedicated machine, e.g. a software module or logic), and interfaces (such as a memory interface) between hardware and software, or a combination of both. Although the depicted methods, processes and logic may be described in terms of sequential operations, it should be appreciated that some of the described operations can be performed in a different order. Moreover, some operations can be performed in parallel rather than sequentially. The following figures include like references that indicate similar elements and in which.

Other features of the described embodiments will be apparent from the accompanying drawings and from the detailed description that follows.

DESCRIPTION OF THE EMBODIMENTS

In a large data center environment, data, including redundant versions of data, is typically stored using distributed data storage. Distributed data storage generally refers to storing data in different locations, including in separate physical media accessible through a storage server system. The storage server system is typically organized into one or more storage nodes or clusters of multiple storage servers systems, collectively known as a data storage subsystem.

In one embodiment, a framework for an NVM parameter configuring mechanism is provided to support workload requests from host computing systems that generate data stored remotely using a storage fabric. A storage fabric generally refers to a storage network architecture that integrates management and access to data that is stored remotely. In one embodiment, data stored remotely using a storage fabric includes data stored remotely in non-volatile storage separately from the host computing systems that generate the data.

In one embodiment, the framework for an NVM parameter configuring mechanism leverages the capabilities of distributed data storage using a disaggregated architecture. A disaggregated architecture refers to disaggregated resources (e.g., memory devices, data storage devices, accelerator devices, general purpose processors) that are selectively allocated, de-allocated and logically coupled to form a composed node. The composed node can function as, for example, a storage server system.

A disaggregated architecture improves the operation and resource usage of a data center relative to data centers that use conventional storage server systems containing compute devices, memory and storage in a single chassis. In one embodiment, data storage (using non-volatile storage) can be provided completely within a disaggregated architecture, such as the Rack Scale Design (RSD) architecture provided by Intel Corporation.

Figure 1:
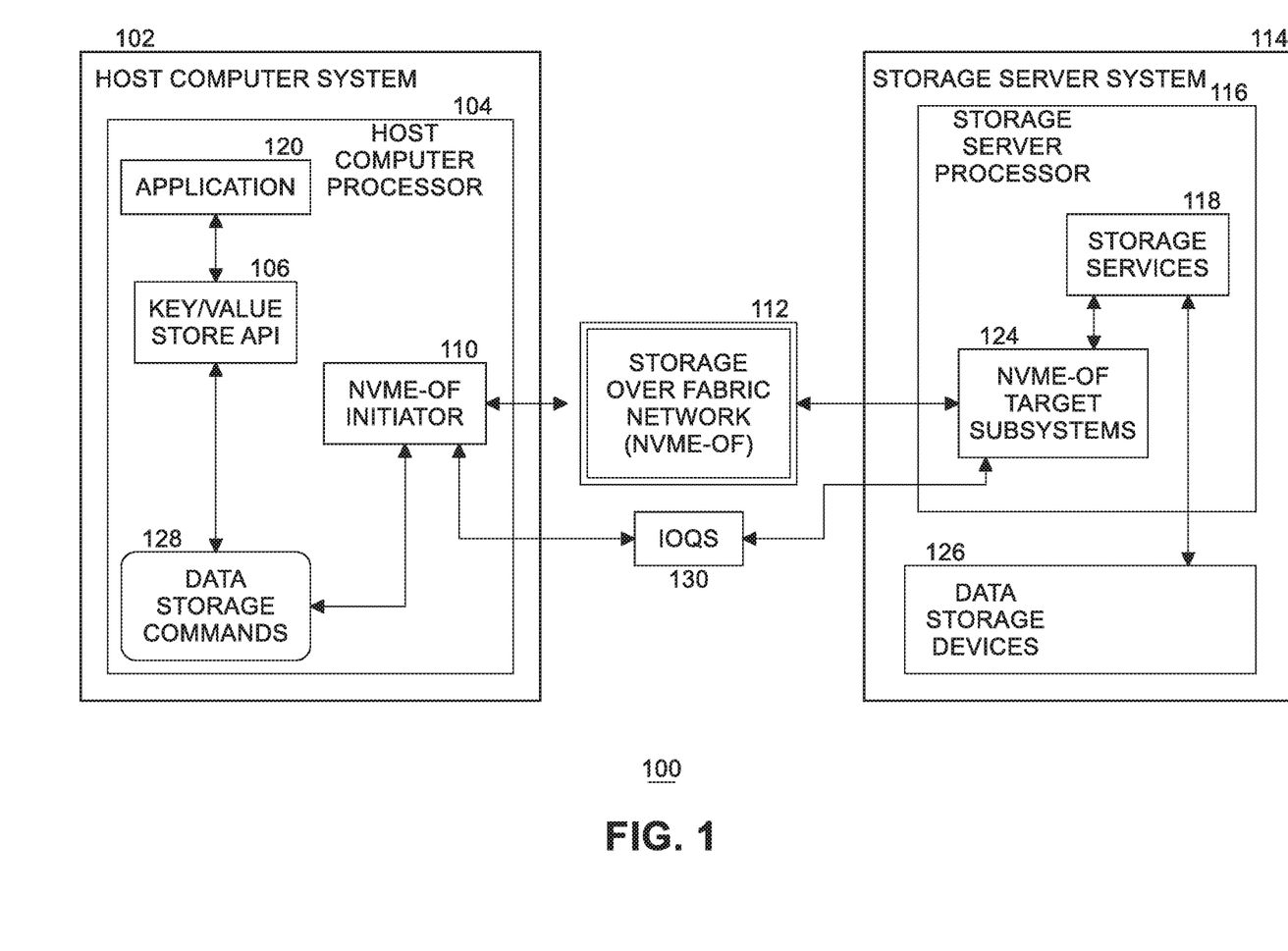
FIG. 1 is a schematic block diagram of a computer system in accordance with embodiments of the present invention.

FIG. 1 is a schematic block diagram of a computer system 100 in accordance with embodiments of the present invention. Referring to FIG. 1, by way of example only and not limitation, one or more host computer systems 102 includes one or more host computer processors 104 executing one or more applications 120, which may require reading data from and writing data to storage server 114. Application 120 running on host processor 104 typically stores data using a key/value store application programming interface (API) 106. Key/Value object store API 106 is capable of transmitting data storage commands 128 (including data of application 120) to corresponding one or more storage subsystems 124 of storage server 114 for storage in one or more data storage devices 126.

Distributed block storage systems such as storage server system 114 provide block device functionality to applications 120 by presenting logical block devices that are stored in segments scattered across a large pool of remote data storage devices 126. To use these logical block devices, applications determine the location of the segments to access.

The Non-Volatile Memory Express (NVMe) Specification describes a system for accesses to data storage devices 126 through a Peripheral Component Interconnect Express (PCIe) port. NVMe is described for example, in the NVM Express™ Base Specification, Revision 1.4 (2019), as well as predecessors, successors, and proprietary variations thereof, which are incorporated by reference in their entirety. NVMe allows a host computer system 102 to specify regions of storage as separate namespaces. A namespace is an addressable domain in an NVM (e.g., data storage device 126) having a selected number of storage blocks that have been formatted for block access. A namespace includes an addressable portion of a media in a solid-state drive (SSD), or a multi-device memory space that spans multiple SSDs or other data storage devices. A namespace ID (NSID) is a unique identifier for an associated namespace. A host computer system 102 accesses a particular NVM by specifying an NSID, a controller ID and an associated logical address for the block or blocks (e.g., logical block addresses (LBAs)).

In one embodiment, host computer system 102 accesses a data storage device 126 using a fabric or network 112. Various storage protocols exist that enable access to data storage devices using a network or fabric. Data storage commands 128 are transported over a network configured with a storage over fabric network protocol, generally referred to herein as a storage over fabric network 112. In one embodiment, the storage over fabric network protocol is the Non-Volatile Memory express over fabric (NVMe-oF) protocol designed to enable access to remote NVMe-compatible solid-state drives (SSDs) (e.g., data storage devices 126).

By way of example only and not limitation, the transport layer of the storage over fabric network 112 is provided using an Ethernet fabric between host computer system 102 and storage server 114 configured with a remote direct memory access (RDMA) transport protocol. NVMe-oF and the RDMA transport protocol enable host computer system 102 to efficiently relay data storage commands 128 directly to non-volatile memory express (NVMe) data storage devices 126. NVMe data storage devices are capable of communicating directly with host processor 104 in host computer system 102, thereby providing high-speed access to data in accordance with the NVMe interface specification. The NVMe-oF network protocol used in storage over fabric network 112 extends the benefits of NVMe data storage devices 126 to a remote host, such as host computer system 102. In other embodiments, other types of network and transport protocols could also be used, such as a Fibre Channel Protocol or other protocols that support block storage data transport to and from non-volatile data storage devices 126.

In one embodiment, data storage commands 128 are relayed to and from key/value store API 106 over the storage over fabric network 112 via an NVMe-oF initiator 110 configured on the host computing system's side of the storage fabric, and a corresponding one or more NVMe-oF target subsystems 124 configured on an opposite side of the storage over fabric network 112, e.g., on the storage side on storage server 114.

In one embodiment, the corresponding one or more NVMe-oF target subsystems 124 can be implemented in one or more storage server processors 116 of storage server system 114. In one embodiment, storage server system 114 can be implemented as a composed node of a data storage system provided using a disaggregated architecture. The composed node is formed from disaggregated resources, including storage server processors 116 and data storage devices 126. In one embodiment, storage server processors 116 and data storage devices 126 reside in one or more storage racks on the storage side of the storage fabric network 112. The storage racks provide the underlying data storage hardware in a data center using a disaggregated architecture.

For example, in one embodiment, the disaggregated resources include compute modules (e.g., including storage server processors 116) and NVMe data storage drives 126 (also referred to herein as NVMe devices) housed in a storage rack (not shown in FIG. 1). The compute modules and NVMe devices are composed to form the storage server system 114. By way of example only and not limitation, the compute modules function using storage server processors 116 for implementing NVMe-oF target subsystems 124 for controlling the storage of data in NVMe data storage devices 126. The NVMe data storage devices function as a pool of block-addressable NV data storage devices 126 for storing data. Taken together, the NVMe-oF target subsystems 124 and block-addressable NV data storage devices 126 form the composed nodes that function as storage server system 114. In one embodiment, NVMe-oF target subsystems 124 control access to the block-addressable NV data storage devices 126 to provide remote storage capacity for the data storage needs of application 120 executing on host computer processor 104 of host computing system 102.

In one embodiment, storage over fabric software (SW) stacks configure and establish a logical connection between the NVMe-oF initiator 110 on the host side, and the corresponding one or more NVMe-oF target subsystems 124 on the storage side. Once the logical connection is established, the NVMe-oF target subsystem 124 exposes to key/value object store API 106, via NVME-oF initiator 110, available blocks of storage capacity on the block-addressable NVM data storage devices 126. The available blocks of storage capacity are those blocks that are accessible via the respective MVMe-oF target subsystems 124.

In one embodiment, a pool of block-addressable NVM data storage devices 126, such as a set of NVMe data storage devices in a given storage server 114, is accessed via a Peripheral Component Interconnect Express (PCIe) bus (not shown). NVMe data storage device 126 comprises an NVM device configured for access using NVM Express, a controller interface that facilitates accessing NVM devices through the PCIe bus. Each of the corresponding NVMe-oF target subsystems 124 manage the data stored on NVMe data storage devices 126 on behalf of host computer system 102, including providing various storage services 118 for managing data stored on NVMe data storage devices 126 (e.g., reading and writing data). Data storage devices 126 each include one or more input/output (I/O) queues (IOQs) 130 for storing requests to access data.

Some inefficiencies exist in the NVMe-oF protocol. NVMe-oF 112 lacks configurable QoS parameters for remote host computer systems 102. In an embodiment, QoS parameters include the number of IOQs 130 allocated to host computer system 102, the depth of each IOQ (e.g., the number of entries in each IOQ), and an ability to assign affinity for IOQs 130 to compute processors 116 in storage server system 114. In an embodiment, IOQs 130 include data structures in storage server system 114 to store data access requests.

In existing systems, when host computer system 102 accesses a given remotely provisioned NVMe-oF target subsystem 124, the I/O QoS for bulk data transfer is based at least in part on the number of IOQs 130 accessible by the NVMe-oF target subsystem (and correspondingly the number of IOQ connections), the depth of each of the IOQs, the IOQ load on each storage server processor 116 supporting NVMe-oF target subsystem 124, and the IOQ memory resource utilization on NVMe-oF target subsystem 124. Currently the number of IOQs any host computer system 102 can use is based on a static calculation of the floor of the number of possible host computer processors 104 on host computer system 102 and a static value provided by NVMe-oF target subsystem 124. All IOQs 130 allocated to host computer system 102 use one selected fabric transport. All connections from host computer system 102 to storage server system 114 are allocated the same number of IOQs with the same QoS and with the same IOQ depth.

When a given NVMe-oF target subsystem 124 provides static remote NVM resources there is no effective limit to the number of host computer systems X that could connect using Y static IOQ connections, where X and Y are natural numbers. Therefore, the number of potential IOQs and associated IOQ connections accessible by a given NVMe-oF target subsystem 124 is X*Y. This could result in consuming an inordinate amount of memory, processor utilization, and storage over fabric network 112 connection overhead on the NVMe-oF target subsystem, perhaps significantly limiting scalability of a sufficient data storage solution for the data center. The lack of dynamic control may negatively affect scalability and efficiency when accessing an NVMe-oF target subsystem over a graphics processing unit (GPU), compute appliance, or a smaller compute element. This may be particularly acute for supporting demands for IOQ access by artificial intelligence (AI) workloads on application 120. In addition, host computer systems that do not require the entire bandwidth could have their allocated number of IOQs and/or IOQ depth decreased so that additional host computer systems could be supported.

Currently there is no mechanism to individually allocate the number of IOQs to a host computer system 102, and to associate a host computer system with specific storage server processors 116 on storage server system 114 or to customize the IOQ depths. The number of IOQs, IOQ depths, and thus QoS for host computer systems is based on the same criteria regardless of usage model QoS requirements.

The number of IOQs and thus I/O connections between host computer system 102 and NVMe-oF target subsystem 124 is negotiated when NVMe-oF initiator 110 connects to an administrative controller of an NVMe-oF target subsystem. This negotiation results in a number of IOQs calculation of:

Floor [number of 'possible' initiator processors, a static value provided by the NVMe-oF target subsystem]

This calculation results in the maximum number of IOQs (MQES) a host computer system may use to create, issue connection requests for, and use for I/O data exchange.

The existing method of negotiating the number of IOQs and thus I/O connections between a given host computer system 102 and a given NVMe-oF target subsystem 124 results in every host computer system having a static number of IOQs and thus IOQ connections to a given NVMe-of target subsystem 124. This is inflexible and is not scalable, especially across different compute elements. Similarly, current IOQ depth for each IOQ on an NVMe-oF target subsystem is based on a static value. This means that each IOQ for each host computer system has the same IOQ depth, which results in underutilized resources in some cases, and underserved host computer systems in other cases. Finally, the lack of ability to assign an affinity of IOQs of NVMe-oF target subsystems 124 to storage server processors 116 can result in inefficient use of compute processor resources and decrease host computer system storage workload performance.

Embodiments of the present invention provide a new method to improve NVMe-oF target subsystem 124 resource utilization and enable fine grained NVMe-oF QoS for each host computer system 102 by dynamically controlling: 1) the number of IOQs that individual host computer systems or groups of host computer systems may use with an NVMe-oF target subsystem for I/O data transfer, 2) IOQ depths for individual IOQs accessible by an NVMe-oF target subsystem assigned to a host computer system for I/O data transfer, and 3) affinity of IOQs to specific storage server processors 116 associated with NVMe-oF target subsystems 124 to improve compute processor utilization and host computer system data storage QoS. As used herein, setting an affinity of an IOQ to a processor (e.g., CPU) results in processing of read and/or write accesses of the IOQ being performed by that processor.

Embodiments of the present invention improve data storage processing using NVMe-oF in scale-out data center infrastructures by supporting: 1) customized QoS for each NVMe-oF Initiator 110 via fine-grained control of the number of IOQs and fine-grained control of IOQ depths for each NVMe-oF target subsystem 124, 2) reduced memory, storage over fabric network and storage server processor overhead for an NVMe-oF target subsystem 124 through an appropriate number of IOQs assigned to a given host computer system 102 (e.g., based at least in part on estimated workload) when provisioned to the NVMe-oF target subsystem 124, 3) efficient load balancing of NVMe-oF target system resources by binding specific IOQss to specific storage server processors associated with the NVMe-oF target subsystem (which can be beneficial in environments such virtual machines (VM)s, Storage-as-a-Service (SaaS), etc.), 4) better alignment with the advantages offered by an Adaptive Queues feature provided by some transports (e.g., transmission control protocol (TCP)), and 5) enabling queue arbitration policies based on host/initiator workload requirements.

Embodiments of the present invention provide a new method by which the maximum number of IOQs available to a host computer system 102 to use with a given remote NVMe-oF target subsystem 124 is exposed as a configurable parameter. In an embodiment, a system administrator may allocate the maximum number of IOQs accessible by a given NVMe-oF target subsystem on an individual host computer system basis or by groups of host computer systems.

In some data centers, system administrators create new one or more NVMe-oF target subsystems 124 to be exposed to host computer systems. An NVMe-oF target subsystem definition includes attributes such as one or more physical NVMe Namespaces, fabric interface (Address type, Family, Address, Port), Transport Service ID, Access Control (allowing any host computer system to access this new target subsystem or restrict the target subsystem to a specific list of host computer systems), and list of host computer systems that may access this target subsystem (if the target subsystem is not globally accessible by any host computer system).

Embodiments of the present invention add new configurable parameters to the NVMe-oF target subsystem definition to indicate the number and depth of IOQs for individual host computer systems or groups of host computer systems that are provisioned to connect to a given NVMe-oF target subsystem 124 for I/O data transfer. In embodiments, host computer systems are provisioned with specific NVMe-oF resources; the host computer system establishes an administrative queue connection to the remote NVMe-oF target subsystem and negotiates the number of IOQs the host computer system may use for data transfer to/from a controller on that remote NVM target subsystem with a configurable IOQ depth.

In this case, the floor calculation will be [maximum number of possible host processors] [Max_IOQ that the NVMe-oF target subsystem will allow that host computer system].

This enables fine-grained control of NVMe-oF target system resources, QoS to an NVMe-oF initiator or group of NVMe-oF initiators accessing a given NVMe-oF target subsystem, and the effective number of NVMe-oF initiators that a given NVMe-oF target subsystem can service.

Figure 2:
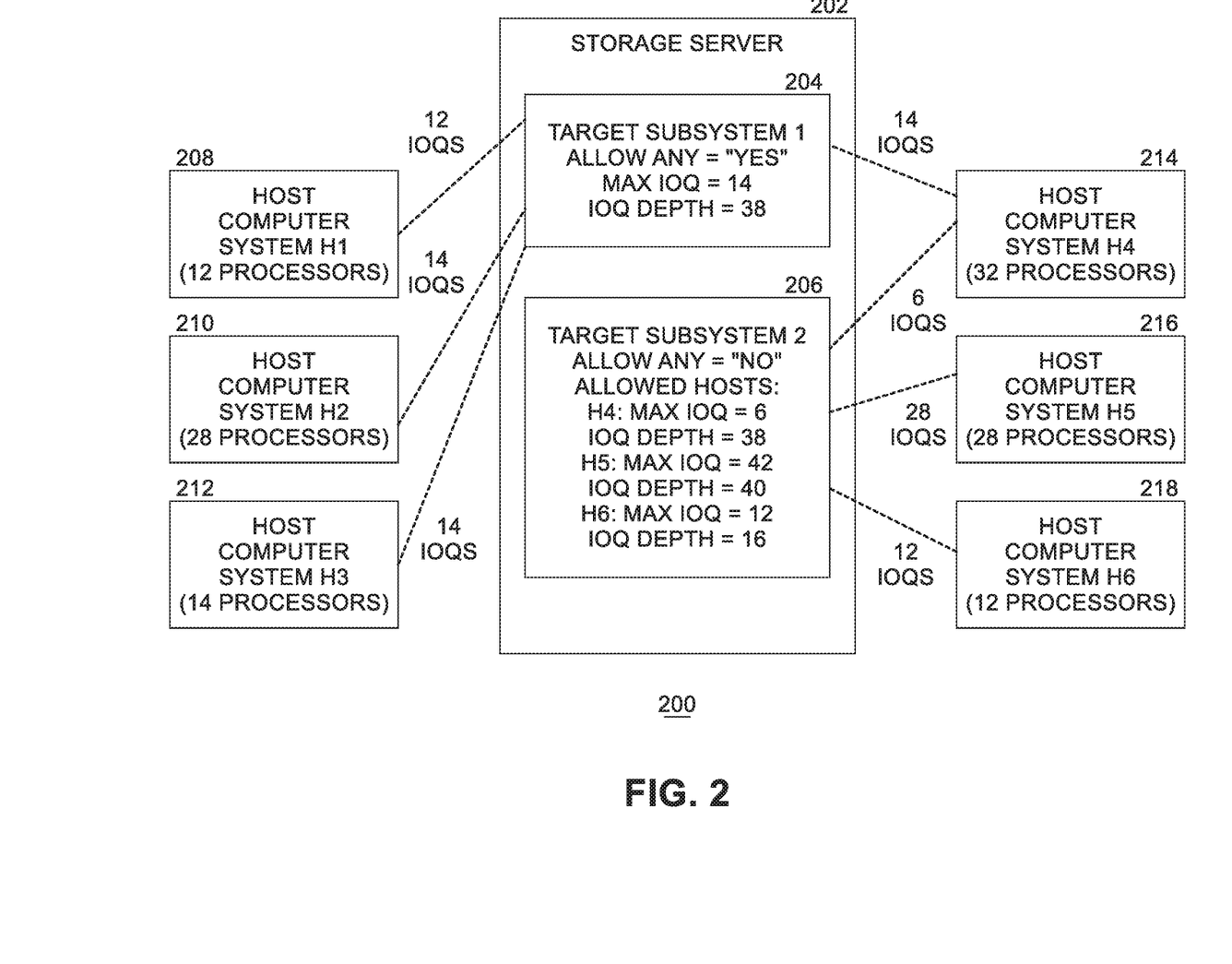
FIG. 2 is a diagram of an example arrangement of host computer systems connecting to NVMe-oF target subsystems according to an embodiment of the present invention.

FIG. 2 is a diagram of an example arrangement 200 of host computer systems connecting to NVMe-oF target subsystems according to an embodiment of the present invention. Storage server 202 services individual workload requests (e.g., requests to read data from or write data to target subsystems) received from host computer systems. In this example, storage server 202 includes two NVMe-oF target subsystems: target subsystem 1 204 and target subsystem 2 206. In other examples, there may be any number of target subsystems per storage server, and any number of storage servers in a data center or disaggregated architecture. In this example, there are six host computer systems sending workload requests to storage server 202, namely host computer system H1 208 having 12 processors, host computer system H2 210 having 28 processors, host computer system H3 212 having 14 processors, host computer system H4 214 having 32 processors, host computer system H5 216 having 28 processors, and host computer system H6 218 having 12 processors. In other examples, there may be any number of host computer systems sending requests to storage server 202, and each host computer system may include any number of processors.

In an embodiment, target subsystem 1 204, for example, includes a configurable parameter "allow any" to allow any host computer system to send workload requests to target subsystem 1 204 when the "allow any" parameter is set to "yes." Target subsystem 1 204 receives those workload requests and services them. Target subsystem 2 206, for example, includes the configurable parameter "allow any" set to "no." In this case, target subsystem 2 206 will only service workload requests from host subsystems that are specified in an "allowed hosts" list. For example, target subsystem 2 206 has an "allowed hosts" list that includes H4 214, H5 216, and H6 218. If target subsystem 2 206 receives a workload request from another host computer system not included in the "allowed hosts" lists, then target subsystem 2 206 does not service the workload request. In an embodiment, a system administrator or other authorized user of computing system 100 may set the configurable parameters for "allow any" and "allowed hosts" for any one or more target subsystems of any one or more storage servers to control system processing, thereby affecting overall QoS for the computing system.

In an embodiment, target subsystem 1 204, for example, includes a configurable parameter "max IOQ" to set the maximum number of IOQs in target subsystem 1 204 that are capable of being assigned to a given host computer system. For example, target subsystem 1 204 may be configured to set a "max IOQ" for the number of IOQs that can be requested by a host computer system. Thus, if target subsystem 1 204 receives a request from any host computer system for a number of IOQs higher than the "max IOQ" parameter value, that request may be denied. In another example, the "max IOQ" may be set individually for one or more host computer systems. In this example, target subsystem 2 206 is configured such that host computer system H4 214 has a "max IOQ" of 6 for IOQs requested to be allocated to H4 214 by target subsystem 2 206. Similarly, host computer system H5 216 has a "max IOQ" of 42 for all IOQs requested to be allocated to H5 216 by target subsystem 2 206, and host computer system H6 218 has a "max IOQ" of 12 for all IOQs requested to be allocated to H6 218 by target subsystem 2 206. In an embodiment, a system administrator or other authorized user of computing system 100 may set the configurable parameters for "max IOQ" for any one or more target subsystems of any one or more storage servers to control system processing, thereby affecting overall QoS for the computing system. Further, a system administrator or other authorized user of computing system 100 may set the configurable parameters for "max IOQ" for any one or more allowed host computer systems for any one or more target subsystems. The value for a maximum number of IOQs for a target subsystem is implementation dependent.

In an embodiment, target subsystem 1 204, for example, includes a configurable parameter "max IOQ depth" to set the maximum number of entries in IOQs in target subsystem 1 204 that are capable of being assigned to a host computer system. For example, target subsystem 1 204 may be configured to set a "max IOQ depth" of 38 for all IOQs managed by target subsystem 1 204, regardless of which host computer system(s) requested the IOQ(s). In another example, the "max IOQ depth" may be set individually for one or more host computer systems. In this example, target subsystem 2 206 is configured such that host computer system H4 214 has a "max IOQ depth" of 38 for IOQs requested to be allocated to H4 214 by target subsystem 2 206. Similarly, host computer system H5 216 has a "max IOQ depth" of 40 for all IOQs requested to be allocated to H5 216 by target subsystem 2 206, and host computer system H6 218 has a "max IOQ" of 16 for all IOQs requested to be allocated to H6 218 by target subsystem 2 206. In an embodiment, a system administrator or other authorized user of computing system 100 may set the configurable parameters for "max IOQ depth" for any one or more target subsystems of any one or more storage servers to control system processing, thereby affecting overall QoS for the computing system. Further, a system administrator or other authorized user of computing system 100 may set the configurable parameters for "max IOQ depth" for any one or more allowed host computer systems for any one or more target subsystems. The value for a maximum number of entries in IOQs for a target subsystem is implementation dependent.

In embodiments of the present invention, provision of configurable parameters for "allow any," "max IOQ," and "IOQ depth" allow target subsystems within storage servers to manage QoS for individual workload requests received from host computer systems. For example, if host computer system H1 208 requests 12 IOQs from target subsystem 1 204, target subsystem 1 204 will service these requests because the "allow any" parameter is set to "yes" and the number of IOQs in the request (e.g., 12) is less than or equal to the "max IOQ" parameter of 14. However, if host computer system H1 208 requests 35 IOQs from target subsystem 1 204, target subsystem 1 204 will not service these requests because the "allow any" parameter is set to "yes" and the number of IOQs in the request (e.g., 35) is more than the "max IOQ" parameter of 14. In an embodiment, target subsystem 1 204 may successfully provide a number of IOQs in a workload request equal to the "max IOQ" parameter value and may deny allocation of the remainder of the requested IOQs in the workload request that exceed the "max IOQ" value.

Therefore, in embodiments of the present invention, target subsystems include logic to manage QoS based at least in part on the configurable parameters of "allow any," "max IOQ," and "IOQ depth" by comparing individual workload requests received from host computer systems to the configurable parameter settings and current operating values associated with those configurable parameters (such as current counts of the number of IOQs allocated per host computer system by a target system, etc.). When an individual workload request may be successfully performed, the receiving target subsystem performs the request. When the request does not meet the requirements specified by the configurable parameters and current operating values, the receiving target subsystem does not perform the request.

In some scenarios, an NVMe-oF target subsystem is created from a remote NVMe resource, or a combination of remote NVMe-oF resources and resources exposed on a different NVMe-oF target subsystem with a lower static "max IOQ" value. In these scenarios, it is possible to have a mismatch in the number of IOQs, resulting in an I/O bottleneck.

Figure 3:
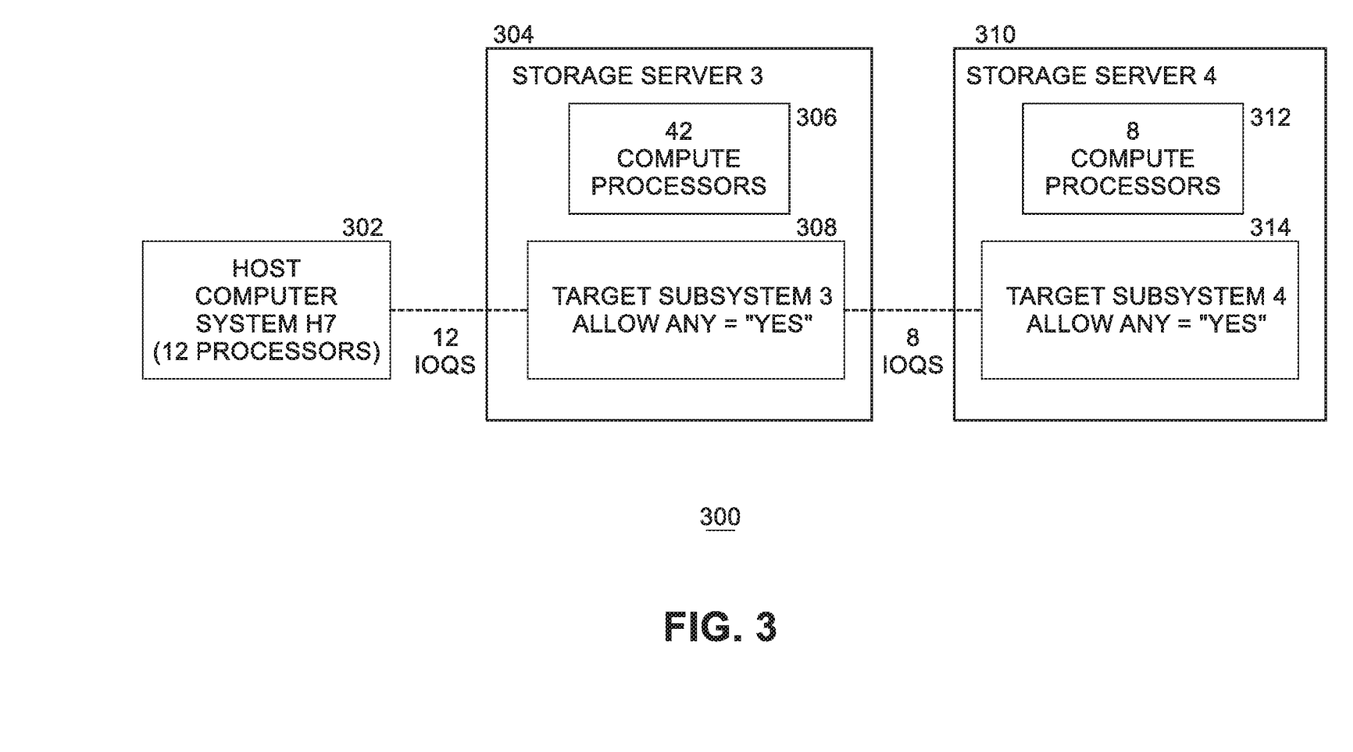
FIG. 3 is a diagram of an example arrangement of multiple cascaded storage servers providing resources to a host computer system according to an embodiment of the present invention.

FIG. 3 is a diagram of an example arrangement 300 of multiple cascaded storage servers 304, 310 providing resources to a host computer system 302 according to an embodiment of the present invention. In FIG. 3, target subsystem 3 308 of storage server 3 304 acts as an NVMe-oF host to establish connection to target subsystem 4 314 of storage server 4 310 to gain access to exposed target subsystem 4 314. Target subsystem 3 308 creates a virtual target subsystem using the resources of target subsystem 4 314 and provisions target subsystem 4 314 to be accessed (indirectly) by host computer system H7 302. In this case, the mismatch between processors on host computer system H7 302, storage server 3 304, and storage server 4 310 will result in host computer system H7 302 using more IOQ connections to target subsystem 3 308 (e.g., 12 IOQs requested) than target subsystem 3 308 uses to access the storage resources on target subsystem 4 314 (e.g., 8 IOQs requested, matching the 8 compute processors accessing target subsystem 4 on storage server 4 310). In a heavy utilization workload, I/O workload requests received on target subsystem 3 308 may backlog as there are fewer IOQs to target subsystem 4 314 to service the requests. Host computer system H7 302 I/O workload requests will potentially backlog on target subsystem 3 308 due to the smaller number of IOQs as compared to the actual storage resources available on target subsystem 4 314. The effects of this backlog include higher latency for host computer system H7 302 requests to complete, more resources used on target subsystem 3 308 to buffer the backlogged requests, and other host computer system H7 302 requests being backlogged as target subsystem 3 308 resources are consumed.

In embodiments of the present invention, a system administrator or other authorized user can tune the number of IOQs any host computer system may use when issuing requests to target subsystem 4 314 resources (through target subsystem 3 308) to remove the "impedance mismatch;" this will increase the efficiency of using target subsystem 3 308 resources and remove the latency bottleneck.

Figure 4:
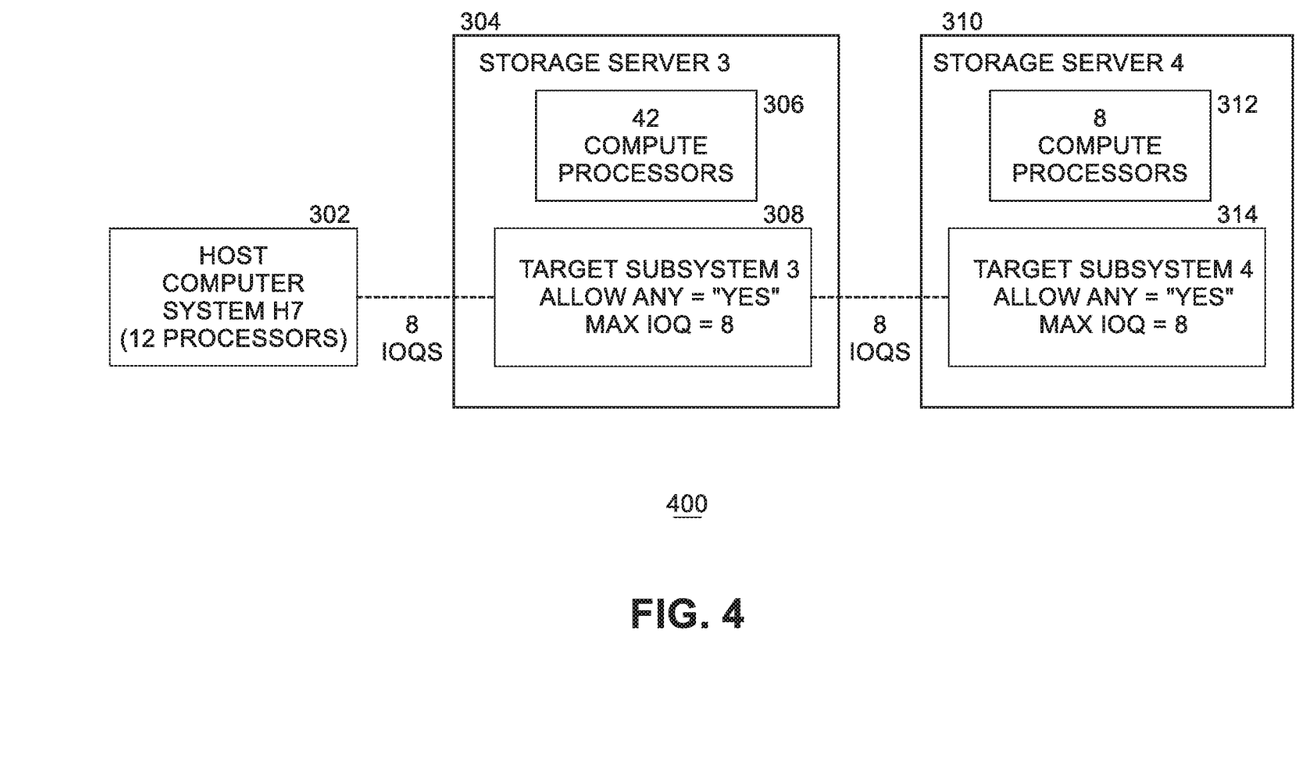
FIG. 4 is a diagram of another example arrangement of multiple cascaded storage server systems providing resources to a host computer system according to an embodiment of the present invention.

FIG. 4 is a diagram of another example arrangement 400 of multiple cascaded storage servers 304, 310 providing resources to a host computer system 302 according to an embodiment of the present invention. In this example, an appropriate propagation of the number of IOQs between host computer system H7 302, target subsystem 3 308, and target subsystem 4 314 alleviates the IOQ mismatch. In an embodiment, this is accomplished by setting the "max IOQ" on target subsystem 3 308 to match the "max IOQ" setting on target subsystem 4 314.

Figure 5:
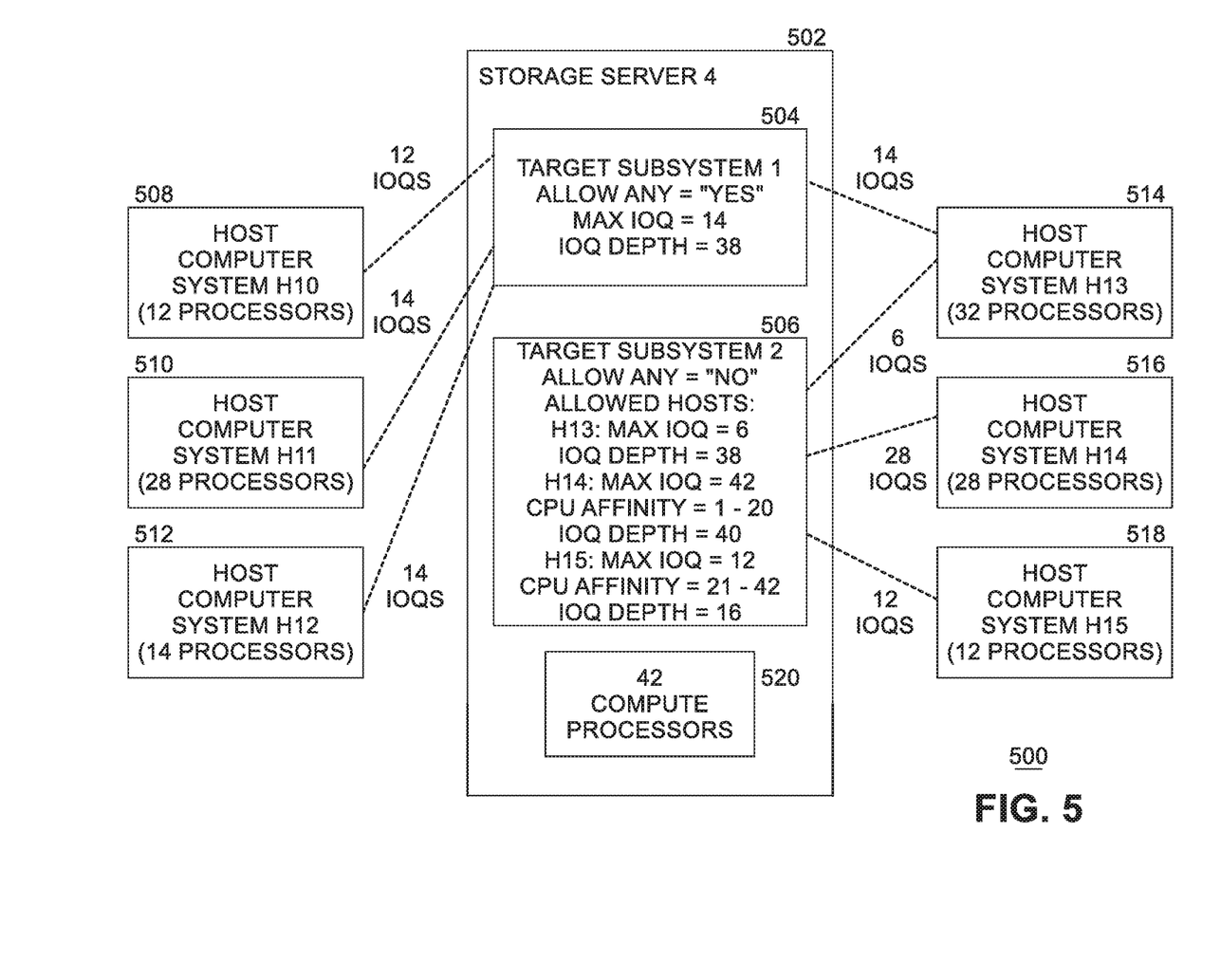
FIG. 5 is a diagram of an example arrangement of host computer systems connecting to NVMe-oF target subsystems using central processing unit (CPU) affinity according to an embodiment of the present invention.

FIG. 5 is a diagram of an example arrangement 500 of host computer systems connecting to NVMe-oF target subsystems 504, 506 using central processing unit (CPU) affinity according to an embodiment of the present invention. A configurable parameter called "CPU affinity" is provided to allow the setting of selected CPUs (e.g., processors or processor cores) in a storage server 502 to be associated with IOQs for a selected host computer system. By allocating CPUs of a storage server to selected IOQs and target subsystems, better efficiency supporting QoS may be obtained. For example, IOQs allocated for host computer system H14 516 are assigned a CPU affinity of 1-20 (indicating that IOQs for H14 are handled by the CPUs identified by those processor ID values). Similarly, IOQs allocated for host computer system H15 518 are assigned a CPU affinity of 21-42. Further, a system administrator or other authorized user of computing system 100 may set the configurable parameters for "CPU affinity" for any one or more allowed host computer systems for any one or more target subsystems of any one or more storage servers.

Figure 6:
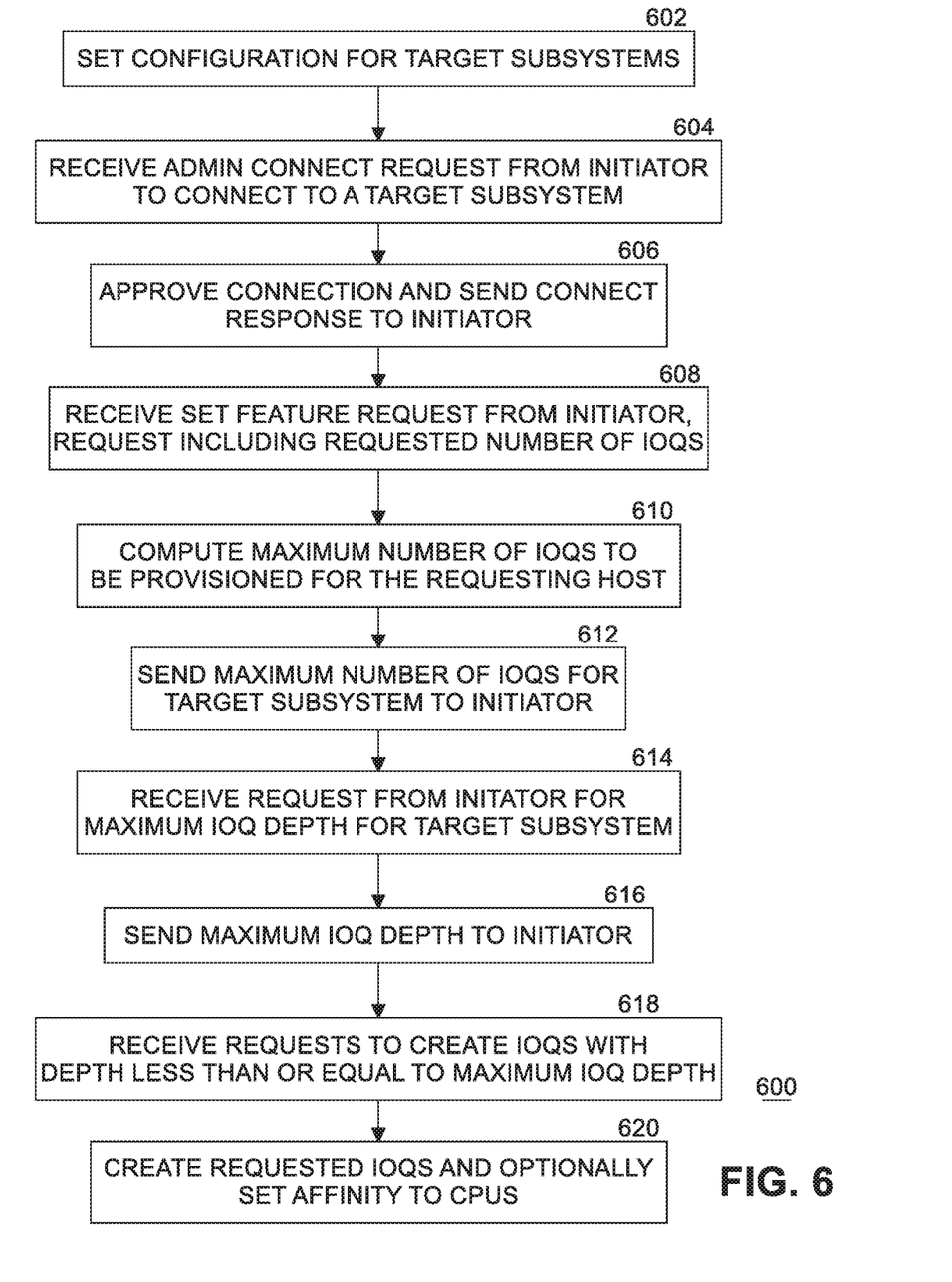
FIG. 6 is a flow diagram of example target subsystem processing according to an embodiment of the present invention.

FIG. 6 is a flow diagram of example target subsystem 124 processing according to an embodiment of the present invention. During initialization of storage server 114, NVMe-OF target subsystems 124 are initialized. At block 602, a configuration is set for each target subsystem of a storage server 114 for provisioning of storage resources (e.g., IOQs) to hosts. For example, a first target subsystem of a storage server could be set to "allow any" and a maximum number of IOQs of 10, with a CPU affinity set to CPUs 0 through 9, and a second target subsystem of the storage server could be set to "allow any" and a maximum number of IOQs of 20, with a CPU affinity set to CPUs 10 through 29. During runtime, at block 604, a NVMe-OF target subsystem receives a first request from a NVMe-OF initiator 110 to connect to the NVMe-OF target subsystem. In an embodiment, the first request is an admin connect request as defined by FIGS. 19 and 20 and accompanying description of the NVMe-OF Specification version 1.1. In an embodiment, the admin connect request comprises a queue ID (QID), a queue connection type, a size of submission/completion queues, queue attributes, a host NVMe-OF qualified name (NQN), a selection of the NVMe-OF target subsystem (e.g., SUBSYS_NQN: 'target subsystem 2), and a host ID.

At block 606, the NVMe-OF target subsystem approves the first request, establishes the connection, and sends a connect response back to the NVMe-OF initiator on the host computer system. At block 608, the NVMe-OF target subsystem receives a second request from the NVMe-OF initiator, the second request including a requested number of IOQs to be provisioned for the host computer system. In an embodiment, the second request is a set feature request according to the NVMe-OF Specification. In an example, the requested number of IOQs for a host computer system could be 30. At block 610, the NVMe-OF target subsystem computes the maximum number of IOQs to be provisioned for the requesting host computer system. In an embodiment, the maximum number of IOQs to be provisioned=MIN (Maximum number of IOQs for the target subsystem, maximum number of IOQs requested by the host computer system). For example, if the maximum number of IOQs configured for the second target subsystem is 20 and the maximum number of IOQs requested by the host computer system is 30, then computing MIN (20, 30) results in a maximum number of IOQs to be provisioned for the host being 20. At block 612, the maximum number of IOQs to be provisioned by the NVMe-OF target subsystem is sent to the requesting host computer system. In an embodiment, application 120 of host computer system 102 computes a maximum number of IOQs=MIN (requested number of IOQs, maximum number of IOQs to be provisioned by the target subsystem). For example, if the requested number of IOQs is 30 and the maximum number of IOQs to be provisioned is 20, then the maximum number of IOQs the host can request from the target subsystem is 20.

At block 614, the NVMe-OF target subsystem receives a third request from the NVMe-OF initiator requesting the maximum IOQ depth for the target subsystem. In an embodiment, the request includes the maximum submission queue size as described by the NVMe-OF Specification. In response, at block 616, the NVMe-OF target subsystem sends the maximum IOQ depth (e.g., associated with and/or set for that host computer system) to the NVMe-OF initiator. The host computer system now knows the number of IOQs that the host can request from the target subsystem, and the maximum depth allowed for those IOQs for this host. The host then requests the target subsystem to create IOQs. At block 618, the NVMe-OF target subsystem receives one or more requests to create IOQs with an IOQ depth less than the maximum IOQ depth for the host. At block 620, the NVMe-OF target subsystem creates the requested IOQs and optionally sets the affinity to a CPU for each IOQ. In an embodiment, blocks 618 are processed for every IOQ create request received from the host. For example, the NVMe-OF target subsystem creates IOQ1 and sets the affinity to CPU 10, creates IOQ2 and sets the affinity to CPU 11, . . . creates IOQN and sets the affinity to CPU 10+(N−1).

Embodiments of the present invention provide fine grained allocation and management of IOQs, IOQ depth, and IOQ CPU affinity. This will help products such as smart network interface controllers (NICs), computational storage, and field programmable gate arrays (FPGA)/accelerators make efficient use of resources. Since maximizing the scalability of NVMe/NVMe-oF devices is a goal, embodiments help increase this scalability. Finally, when cascaded target subsystems are accessed, embodiments can eliminate bandwidth impedance in NVMe-oF fan-out installations.

Figure 7:
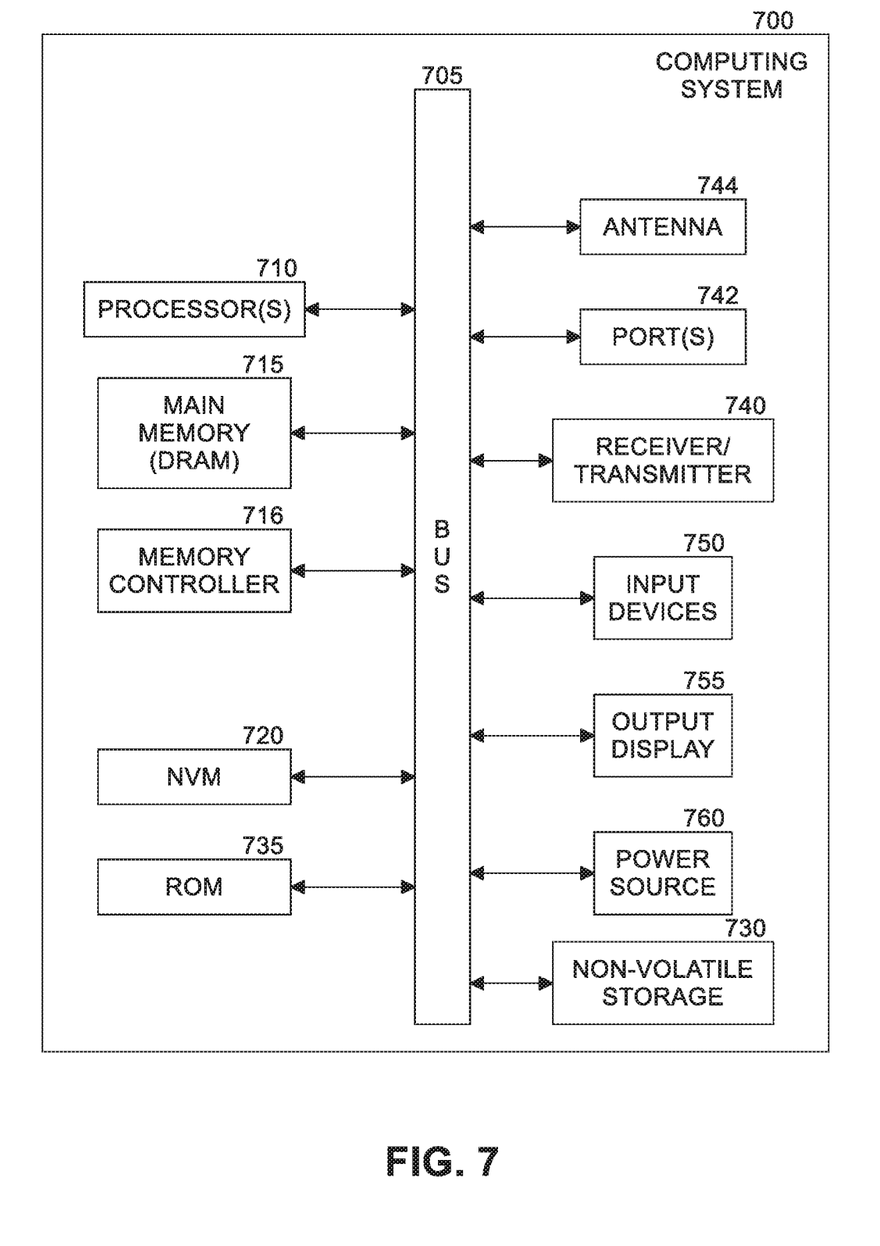
FIG. 7 illustrates an example of a computer system in which embodiments of processes for configuring parameters for workload request QoS in NVM target subsystems can be implemented, either in whole or in part, in accordance with embodiments of the present invention.

FIG. 7 is an illustration of a general computing system 700 in which configurable parameters to support individual workload request QoS for non-volatile storage 730 can be implemented, including, for example, the logic for NVMe-oF target subsystems 124 and related storage services 118 (including reading and writing data storage devices 126), in accordance with an embodiment. In this illustration, certain standard and well-known components that are not germane to the present description are not shown. Elements that are shown as separate elements may be combined, including, for example, a SoC (System on Chip) combining multiple elements on a single chip.

In some embodiments, a computing system 700 includes a processing means such as one or more processors 710 coupled to one or more buses or interconnects, shown in general as bus 705. The processors 710 comprises one or more physical processors and one or more logical processors. In some embodiments, the processors include one or more general-purpose processors or special-purpose processors for executing logic as described above in FIG. 1 through 6.

The bus 705 is a communication means for transmission of data. The bus 705 is illustrated as a single bus for simplicity but may represent multiple different interconnects or buses and the component connections to such interconnects or buses may vary. The bus 705 shown in FIG. 7 is an abstraction that represents any one or more separate physical buses, point-to-point connections, or both connected by appropriate bridges, adapters, or controllers.

In some embodiments, the computing system 700 further comprises a random-access memory (RAM) or other dynamic storage device or element as a main memory 715 and memory controller 716 for storing information and instructions to be executed by the processors 710. Main memory 715 includes, but is not limited to, dynamic random-access memory (DRAM). In some embodiments, the RAM or other dynamic storage device or element includes storage services 118 and/or target subsystems for implementing access to non-volatile storage devices.

The computing system 700 also comprises a non-volatile memory 720; a non-volatile storage device such as a solid-state drive (SSD) 730; and a read-only memory (ROM) 735 or another type of static storage device for storing static information and instructions for the processors 710. The term "non-volatile memory" or "non-volatile storage" as used herein is intended to encompass all non-volatile storage media, such as solid state drives (SSD) and other forms of non-volatile storage and memory devices, collectively referred to herein as a non-volatile memory (NVM) device.

An NVM device is a memory whose state is determinate even if power is interrupted to the device. In one embodiment, the NVM device comprises a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also include a byte-addressable write-in-place three dimensional cross-point memory device, or other byte addressable write-in-place NVM devices (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto-resistive random access memory (MRAIVI) that incorporates memristor technology, spin transfer torque (STT)-MRAIVI, a spintronic magnetic junction memory based device, a magnetic tunneling junction (MTJ) based device, a DW (Domain Wall) and SOT (Spin Orbit Transfer) based device, a thyristor-based memory device, or a combination of any of the above, or other memory. The memory device may refer to the die itself and/or to a packaged memory product.

In some embodiments, the computing system 700 includes one or more transmitters or receivers 740 coupled to the bus 705. In some embodiments, the computing system 700 includes one or more antennae 744, such as dipole or monopole antennae, for the transmission and reception of data via wireless communication using a wireless transmitter, receiver, or both, and one or more ports 742 for the transmission and reception of data via wired communications. Wireless communication includes, but is not limited to, Wi-Fi, Bluetooth™, near field communication, and other wireless communication standards.

In some embodiments, computing system 700 includes one or more input devices 750 for the input of data, including hard and soft buttons, a joystick, a mouse or other pointing device, a keyboard, voice command system, or gesture recognition system.

In some embodiments, computing system 700 includes an output display 755, where the output display 755 may include a liquid crystal display (LCD) or any other display technology, for displaying information or content to a user. In some environments, the output display 755 includes a touch screen that is also utilized as at least a part of an input device 750. Output display 755 further includes audio output, including one or more speakers, audio output jacks, or other audio, and other output to the user.

The computing system 700 also comprises a battery or other power source 760, which may include a solar cell, a fuel cell, a charged capacitor, near-field inductive coupling, or other system or device for providing or generating power in the computing system 700. The power provided by the power source 760 is distributed as required to elements of the computing system 700.

It will be apparent from this description that aspects of the described embodiments could be implemented, at least in part, in software. That is, the techniques and methods described herein could be carried out in a data processing system in response to its processor executing a sequence of instructions contained in a tangible, non-transitory memory such as the memory 715 or the non-volatile memory 720 or a combination of such memories, and each of these memories is a form of a machine-readable, tangible storage medium.

Hardwired circuitry could be used in combination with software instructions to implement the various embodiments. For example, aspects of the described embodiments can be implemented as software installed and stored in a persistent storage device, which can be loaded and executed in a memory by a processor (not shown) to carry out the processes or operations described throughout this application. Alternatively, the described embodiments can be implemented at least in part as executable code programmed or embedded into dedicated hardware such as an integrated circuit (e.g., an application specific IC or ASIC), a digital signal processor (DSP), a field programmable gate array (FPGA), or controller which can be accessed via a corresponding driver and/or operating system from an application. Furthermore, the described embodiments can be implemented at least in part as specific hardware logic in a processor or processor core as part of an instruction set accessible by a software component via one or more specific instructions.

Thus, the techniques are not limited to any specific combination of hardware circuitry and software or to any particular source for the instructions executed by the data processing system.

All or a portion of the described embodiments can be implemented with logic circuitry, such as the above-described ASIC, DSP or FPGA circuitry, including a dedicated logic circuit, controller or microcontroller, or another form of processing core that executes program code instructions. Thus, processes taught by the discussion above could be performed with program code such as machine-executable instructions that cause a machine that executes these instructions to perform certain functions. In this context, a "machine" is typically a machine that converts intermediate form (or "abstract") instructions into processor specific instructions (e.g. an abstract execution environment such as a "virtual machine" (e.g. a Java Virtual Machine), an interpreter, a Common Language Runtime, a high-level language virtual machine, etc.), and/or, electronic circuitry disposed on a semiconductor chip (e.g. "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture can be used to store program code. An article of manufacture that stores program code can be embodied as, but is not limited to, one or more memories (e.g. one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g. a server) to a requesting computer (e.g. a client) by way of data signals embodied in a propagation medium (e.g. via a communication link (e.g. a network connection)).

The term "memory" as used herein is intended to encompass all volatile storage media, such as dynamic random-access memory (DRAM) and static RAM (SRAM) or other types of memory described elsewhere in this application.

Computer-executable instructions can be stored on non-volatile storage devices, such as a magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to the desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The described embodiments also relate to an apparatus for performing the operations described herein. This apparatus can be specially constructed for the required purpose, or it may comprise a general-purpose computer selectively activated or reconfigured by a computer program stored in the computer. Either way, the apparatus provides the means for carrying out the operations described herein. The computer program can be stored in a computer-readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems can be used with programs in accordance with the teachings herein, or it may prove convenient to construct a more specialized apparatus to perform the operations described. The required structure for a variety of these systems will be evident from the description provided in this application. In addition, the embodiments are not described with reference to any particular programming language. It will be appreciated that a variety of programming languages could be used to implement the teachings of the embodiments as described herein.

Numerous specific details have been set forth to provide a thorough explanation of embodiments of the methods, media, and systems for providing data integrity for non-volatile storage. It will be apparent, however, to one skilled in the art, that an embodiment can be practiced without one or more of these specific details. In other instances, well-known components, structures, and techniques have not been shown in detail so as to not obscure the understanding of this description.

Reference in the foregoing specification to "one embodiment" or "an embodiment" means that a particular feature, structure, or characteristic described in connection with the embodiment can be included in at least one embodiment. The appearances of the phrase "in one embodiment" in various places in the specification do not necessarily all refer to the same embodiment.

In the foregoing description, examples may have included subject matter such as a method, a process, a means for performing acts of the method or process, an apparatus, a memory device and/or storage device, and a system for providing data integrity for non-volatile storage, and at least one machine-readable tangible storage medium including instructions that, when performed by a machine or processor, cause the machine or processor to performs acts of the method or process according to embodiments and examples described herein.

In the foregoing specification, embodiments have been described with reference to specific exemplary embodiments. It will be evident that various modifications could be made to the described embodiments without departing from the broader spirit and scope of the embodiments as set forth in the following claims. The specification and drawings are, accordingly, to be regarded in an illustrative sense rather than a restrictive sense.

What is claimed is:

1. A storage server, comprising:
a plurality of non-volatile data storage devices, the plurality of non-volatile data storage devices including a plurality of input/output (I/O) queues (IOQs) to store data received from a plurality of host computer systems over a storage over fabric network;
a first target subsystem to receive requests from a first plurality of host computer systems for allocation of IOQs by the first target subsystem, to dynamically determine customized quality of service (QoS) parameters for the first plurality of host computer systems in response to receiving the requests, and to send the dynamically determined customized QoS parameters to the first plurality of host computer systems, the dynamically determined customized QoS parameters including a maximum number of the IOQs and a maximum depth of the IOQs to be provisioned for the first plurality of host computer systems by the first target subsystem; and
a second target subsystem to receive requests from a second plurality of host computer systems for allocation of IOQs by the second target subsystem, the second plurality of host computer systems including a first host computer system and a second host computer system, to dynamically determine customized first QoS parameters for the first host computer system in response to receiving a request from the first host computer system, to send the dynamically determined customized first QoS parameters to the first host computer system, to dynamically determine customized second QoS parameters for the second host computer system in response to receiving a request from the second host computer system, and to send the dynamically determined customized second QoS parameters to the second host computer systems, the dynamically determined customized first QoS parameters including a first maximum number of the IOQs and a first maximum depth of the IOQs to be provisioned for the first host computer system by the first target subsystem, and the dynamically determined customized second QoS parameters including a second maximum number of the IOQs and a second maximum depth of the IOQs to be provisioned for the second host computer system by the second target subsystem.

2. The storage server of claim 1, comprising:
the maximum number of the IOQs to be provisioned for the first plurality of host computer systems being a lesser of a maximum number of IOQs for the first target subsystem and a number of IOQs requested by the first plurality of host computer systems.

3. The storage server of claim 1, comprising:
the maximum depth of the IOQs to be provisioned for the first plurality of host computer systems being less than or equal to a maximum submission queue size.

4. The storage server of claim 1, comprising:
the first target subsystem to create IOQs in response to a request from one of the first plurality of host computer systems when a number of IOQs being requested is less than or equal to a maximum number of IOQs to be provisioned for the requesting one of the first plurality of host computer systems.

5. The storage server of claim 1, comprising:
the first target subsystem to create IOQs in response to a request from one of the first plurality of host computer systems when IOQs requested to be created have requested depths less than or equal to a maximum depth of the IOQs to be provisioned for the requesting one of the first plurality of host computer systems.

6. The storage server of claim 1, comprising:
a plurality of processors;
wherein the first target subsystem assigns at least one of the IOQs to be read and/or written by a selected one of the plurality of processors.

7. The storage server of claim 1, comprising:
the first maximum number of the IOQs to be provisioned for the first host computer system being a lesser of a maximum number of IOQs for the second target subsystem and a number of IOQs requested by the first host computer system; and
the second maximum number of the IOQs to be provisioned for the second host computer system being a lesser of the maximum number of IOQs for the second target subsystem and a number of IOQs requested by the second host computer system.

8. The storage server of claim 7, comprising:
wherein the first maximum number of IOQs is different than the second maximum number of IOQs.

9. The storage server of claim 1, comprising:
the first maximum depth of the IOQs to be provisioned for the first host computer system being less than or equal to a maximum submission queue size; and
the second maximum depth of the IOQs to be provisioned for the second host computer system being less than or equal to the maximum submission queue size.

10. The storage server of claim 9, comprising:
wherein the first maximum depth is different than the second maximum depth.

11. The storage server of claim 1, comprising:
the first target subsystem to create IOQs in response to a request from one of the first plurality of host computer systems when a number of IOQs being requested is less than or equal to a maximum number of IOQs to be provisioned for the requesting one of the first plurality of host computer systems.

12. The storage server of claim 1, comprising:
the first target subsystem to create IOQs in response to a request from one of the first plurality of host computer systems when IOQs requested to be created have requested depths less than or equal to a maximum depth of the IOQs to be provisioned for the requesting one of the first plurality of host computer systems.

13. The storage server of claim 1, comprising:
the second target subsystem to create IOQs in response to a request from the first host computer system when a number of IOQs being requested is less than or equal to the first maximum number of IOQs to be provisioned for first host computer system; and
the second target subsystem to create IOQs in response to a request from the second host computer system when a number of IOQs being requested is less than or equal to the second maximum number of IOQs to be provisioned for second host computer system.

14. The storage server of claim 1, comprising:
the second target subsystem to create IOQs in response to a request from the first host computer system when IOQs requested to be created have requested depths less than or equal to a first maximum depth of the IOQs to be provisioned for the first host computer system; and
the second target subsystem to create IOQs in response to a request from the second host computer system when IOQs requested to be created have requested depths less than or equal to a second maximum depth of the IOQs to be provisioned for the second host computer system.

* * * * *